United States Patent [19]

Hülsebusch

[11] 4,048,870
[45] Sept. 20, 1977

[54] CHANGE GEAR TRANSMISSION FOR MOTOR VEHICLES, ESPECIALLY FOR USE IN AGRICULTURE AND CONSTRUCTION

[75] Inventor: Karl-Heinz Hülsebusch, Cologne, Germany

[73] Assignee: Klockner-Humboldt-Deutz Aktiengesellschaft, Cologne, Germany

[21] Appl. No.: 697,131

[22] Filed: June 17, 1976

[30] Foreign Application Priority Data

June 18, 1975 Germany .............................. 2527052

[51] Int. Cl.² ............................................. G05G 9/14
[52] U.S. Cl. ..................................... 74/473 R; 74/359
[58] Field of Search .................... 74/473 R, 474, 475, 74/476, 477, 359, 360, 372

[56] References Cited

U.S. PATENT DOCUMENTS

| 812,664 | 2/1906 | Meinhard | 74/473 X |
| 1,862,993 | 6/1932 | Wise | 74/372 |
| 1,870,134 | 8/1932 | Newcomb | 74/372 |
| 2,694,943 | 11/1954 | Brumbaugh | 74/473 R |

Primary Examiner—Allan D. Herrmann
Attorney, Agent, or Firm—Walter Becker

[57] ABSTRACT

A change gear transmission, especially for use in agriculture and construction, which includes a shift stage which is shiftable by means of a shift member through the intervention of an axially displaceable shift fork. The shift fork is mounted on a shift rod which is directly or indirectly journalled in the transmission housing. In or on the transmission housing there is journalled a counter shaft or auxiliary shaft which is parallel to an input or output shaft of the transmission. The shift rod associated with the shift fork is arranged coaxially with regard to the counter or auxiliary shaft.

9 Claims, 2 Drawing Figures

CHANGE GEAR TRANSMISSION FOR MOTOR VEHICLES, ESPECIALLY FOR USE IN AGRICULTURE AND CONSTRUCTION

The present invention relates to a change grear transmission, especially for motor vehicles employed in agriculture and in construction, which is provided with a shift stage which is shiftable and displaceable by means of a shift member through the intervention of an axially displaceable shift fork which latter is mounted on a shift rod journalled directly or indirectly in the transmission housing in which directly or indirectly there is mounted a countershaft or auxiliary shaft that is parallel to an input or an output shaft.

With the change gear transmissions of the above mentioned type, the problem arises to mount the shift rod associated with the shift fork in a space-saving and from a manufacturing standpoint favorable manner, at the shortest possible distance from the shift member.

These and other objects and advantages of the invention will appear more clearly from the following specification in connection with the accompanying drawing, in which.

Figure 1:
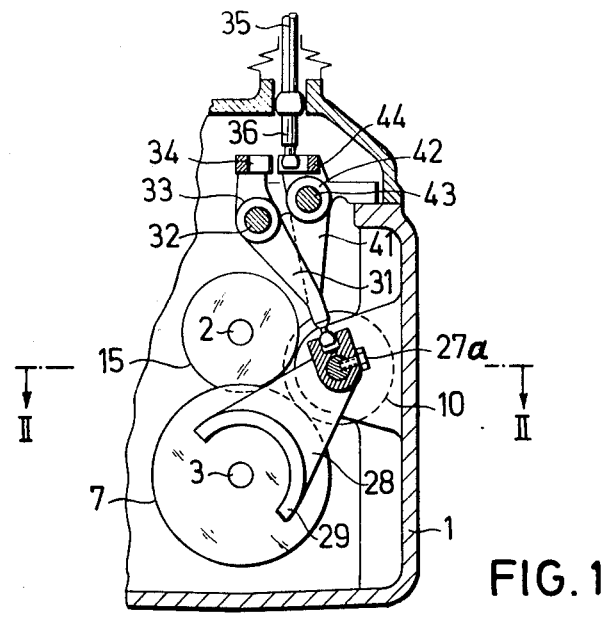
FIG. 1 shows a fragmentary cross section through a transmission according to the invention, said section being taken along the line I—I of FIG. 2.
Figure 2:
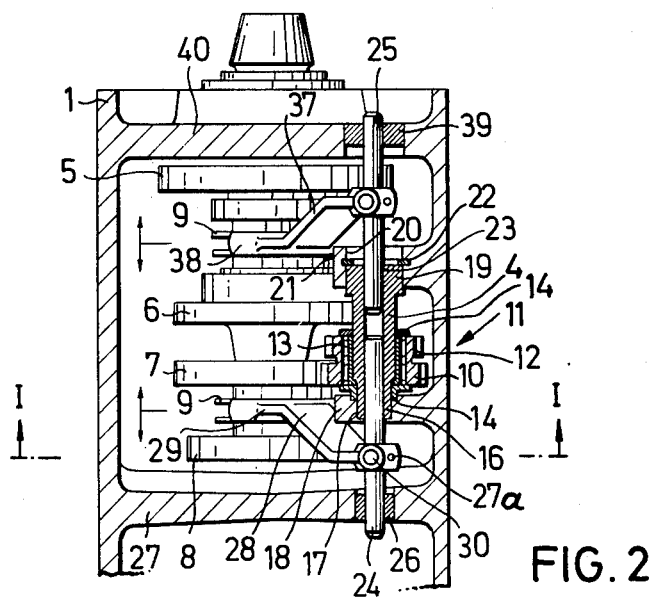
FIG. 2 represents a longitudinal section through the gear change transmission of FIG. 1, said section being taken along the line II—II of FIG. 1.

The problem underlying the present invention has been solved according to the invention by mounting the shift rod which is associated with the shift fork co-axially with regard to the shaft or auxiliary shaft. This brings about that the shift rod which is associated with the shift fork can without the preparation of a particular mounting offset to the mounting of the transmission shaft, be journalled while using the bearing tap (Lagerstich) of said counter or auxiliary shaft. The solution according to the present invention to the above outlined problem, therefore, is particularly suitable for the mass production of a transmission housing and its employment for a plurality of pairs of gears because even pairs of gears with gears considerably differing in diameter are in contrast to their heretofore known design not impeded by the shift rod associated with the shift fork.

According to a further development of the invention, for providing a particularly economical solution of the problem underlying the invention, it is provided that the shift rod associated with the shift fork is journalled in the auxiliary shaft. This brings about the advantage that the auxiliary shaft can be used for several purposes. In this connection, it is advantageous non-rotatably to journal the auxiliary shaft which serves for journalling the shift rod associated with the shift fork while the gears associated with the auxiliary shaft are freely rotatable on said auxiliary shaft.

According to a further feature of the invention, it is provided that the shift rod associated with the shift fork has one end journalled in the auxiliary shaft whereas its other end is directly or indirectly journalled in the transmission. For shifting larger shift members, it is furthermore expedient that the shift rod associated with the shift fork has one end journalled in a bushing in or on the transmission housing, which bushing as to its bearing diameter corresponds to the outer diameter of the auxiliary shaft.

If with a change gear transmission, the coutnershaft or auxiliary shaft is journalled at both ends in webs between two bearing brackets serving for journalling the input and/or output shafts, it is provided according to the invention for a multiple use of the countershaft, that both ends of the countershaft are designed for journalling a shift rod receiving a shift fork. In this connection, for purposes of a simpler manufacture and assembly of the countershaft and the shift rods, it is expedient that the countershaft is journalled in the webs through the intervention of two bearings which differ in their outer diameter, and that both rods receiving and supporting a shift fork are journalled in the bearing brackets of the transmission housing by means of one bushing each. For further simplifying the assembly of the auxiliary shaft and of the shift members, it is provided according to the invention that the shift rod which supports a shift fork and is journalled in that end of the shaft which has the bearing of the smaller diameter, is by means of a bushing journalled in a bearing bracket. The outer diameter of said bushing corresponds to the outer diameter of the smaller bearing of the countershaft. The bushing which serves for journalling thee other shifting rod supporting a shift fork corresponds as to its outer diameter to the diameter of the greater bearing of the countershaft or is designed greater.

Referring now to the drawing in detail, the change gear transmission shown therein comprises a transmission housing 1 in which in non-illustrated bearings there are jounalled an imput shaft 2, an output shaft 3 and an auxiliary shaft 4 which is parallel to said shafts 2 and 3. The output shaft 3 has freely rotatably mounted thereon gears 5 and 6 which by means of a double gear shift sleeve 9 are selectively adapted to be clutched to the output shaft 3. The gears 5, 6 and 8 mesh with gears which are non-rotatably connected to the input shaft 2 and together form three forward stages or velocity ranges of the change gear transmission.

Gear 7 meshes with the gear 10 of a reversible countershaft 11. The reversible countershaft 11 includes a gear 12 which is non-rotatably connected to the gear 10 and which with gear 12 is journalled by means of an anti-friction bearing 13 on the countershaft 4 which is non-rotatably arranged in housing 1, and is axially fixed by collars 14. Gear 12 meshes with a gear 15 which is non-rotatably connected to the input shaft 2. The gears 7, 10, 12 and 15 form a rearward shift stage of the change gear transmission.

For non-rotatably journalling the countershaft, the latter is at one end provided in the transmission housing 1 with a collar 16 having a smaller outer diameter, said collar 16 being press fitted in the associated bearing bore 17 of a web 18 of the transmission housing. At its other end, the countershaft 4 is provided with a collar 19 which has a greater outer diameter than the collar 16. Collar 19 is press fitted into an associated bearing bore 20 of a web 21. The countershaft 4 is by means of a spring ring 22 fixed in a groove of the web 21 to prevent axial movement of said countershaft.

The countershaft 4 is provided with a guiding bore 23 which servers as journal for a first shift rod or control rod 24 and a second shift rod or control rod 25. These rods 24, 25 preferably have the same dimensions. The first shift rod 24 is with its other end through the intervention of bushing 26 journalled in the bearing barcket 27 of the transmission housing 1, said bushing 26 having an outer diameter corresponding to the outer diameter of the collar 16. The first shift rod 24 has associated therewith a shift fork 28 which by means of a screw 27a is connected to the shift rod 24. The shift fork 28 engages by means of its shift key 29 a double gear shift sleeve 29 which serves for clutching the gears 7 and 8 to the output shaft 3. The shift fork 28 comprises a follower bore 30 which is engaged by the shifting arm 31 of a shift lever 33 which is mounted on a shift rod 32. The shift lever 33 comprises a follower key 34 which when shifting the lowest forward shifting stage or the rearward first stage is engaged by a shift lever 35 by means of its shift finger 36. To the second shift rod 25 there is connected a shift fork 37 which by means of its shift key 38 engages the double gear shift sleeve 9. The connection of the shift fork 37 to the second shift rod 25 is effected by a screw 27a. The sleeve 9 is arranged between the two gears 5 and 6 and serves for shifting the lowest and second lowest shifting stage. The second shift rod 25 has one end journalled in a bushing 39 the outer diameter of which corresponds to the outer diameter of the bushing 19. The bushing 39 is press fitted in a bearing bracket 40 of the transmission housing 1. The shift fork 37 is similar to the shift fork 28 provided with a follower bore engaged by a shift arm 41 of a shift lever 42 which latter is mounted on a shift rod 43 and provided with a key 44. In the shifting position for shifting the lowest or the second lowest shift stage of the change gear transmission, the first finger 36 of the shift lever 42 engages the key 44.

It may be mentioned that the solution according to the present invention is also applicable to change gear transmissions employing gear chains in which a countershaft serves as mount for a sprocket wheel. furthermore, it may be mentioned that the solution according to the invention is also applicable in connection with a change gear transmission in which the shift finger 36 of the shift lever 35 directly engages an associated key of the first shift rod 24 and second shift rod 25 or an associated key of the shift fork 28 and 38. The solution according to the invention is also applicable with a change gear transmission the countershaft of which is not directly journalled in webs of the transmission housing 1 but in webs arranged in a cover which is connected to the transmission housing 1.

It is, of course, to be understood that the present invention is, by no means, limited to the specific showing in the drawing, but also comprises any modifications within the scope of the appended claims.

What I claim is:

1. A change gear transmission for motor vehicles, especially for use in agriculture and construction, which includes: a transmission housing, a shift stage comprising gear means arranged in said transmission housing, shifting means comprising axially displaceable shift fork menas and operable to control said shift stage, shift rod means arranged within said transmission housing and having said shift fork means connected thereto and supported thereby, an input shaft and an output shaft both arranged within said transmission housing, an auxiliary shaft likewise arranged within said transmission housing and extending parallel to one of said other shafts, said shift rod means being coaxially arranged with regard to said auxiliary shaft, said auxiliary shaft being non-rotatably journalled, and gears freely rotatably mounted on said auxiliary shaft.

2. A transmission according to claim 1, in which said shift rod means are journalled in said auxiliary shaft.

3. A transmission according to claim 1, which includes bearing bushing means supported by said transmission housing and having journalled therein one end portion of said shift rod means, said bearing bushing means having an outer diameter corresponding to the bearing diameter of said auxiliary shaft.

4. A change gear transmission for motor vehicles, especially for use in agriculture and construction, which includes: a transmission housing, a shift stage comprising gear means arranged in said transmission housing, shifting means comprising axially displaceable shift fork means and operable to control said shift stage, shift rod means arranged within said transmission housing and having said shift fork means connected thereto and supported thereby, an input shaft and an output shaft both arranged within said transmission housing, and an auxiliary shaft likewise arranged within said transmission housing and extending parallel to one of said other shafts, said shift rod means being coaxially arranged with regard to said auxiliary shaft, said shift rod means having one end journalled in said auxiliary shaft and having its other end supported by said transmission housing.

5. A transmission according to claim 4, which includes:

two bearing brackets arranged in said transmission housing in spaced relationship to each other and having at least one of said input and output shafts rotatably journalled therein, and in which said shift rod means comprises two axially aligned shift rods, each of said shift rods having one end portion axially slidably journalled in said auxiliary shaft.

6. A transmission according to claim 5, in which said auxiliary shaft has an axial longitudinal bore of uniform diameter for receiving said two shift rods.

7. A transmission according to claim 5, in which said two shift rods are of substantially the same length and diameter.

8. A change gear transmission for motor vehicles, especially for use in agriculture and construction, which includes: a transmission housing, a shift stage comprising gear means arranged in said transmission housing, shifting means comprising axially displaceable shift fork means and operable to control said shift stage, shift rod means arranged within said transmission housing and having said shift fork means connected thereto and supported thereby, an input shaft and an output shaft both arranged within said transmission housing, and an auxiliary shaft likewise arranged within said transmission housing and extending parallel to one of said other shfats, said shift rod means being coaxially arranged with regard to said auxiliary shaft, the interior of said transmission housing being provided with a first pair of webs, said webs being spaced from each other and respectively comprising two aligned bores having the end portions of said auxiliary shaft fixedly arranged therein, said transmission housing also having a second pair of webs therein, the webs of said second pair of webs being spaced from each other in the axial direction of said auxiliary shaft and being provided with means slidably receiving and guiding said shift rod means.

9. A transmission according to claim 8, in which the two end portions of said auxiliary shaft respectively have a different size diameter, and in which the webs of said second pair of webs are respectively provided with two different size bushings axially aligned with said shift rod means, the outer diameter of the larger size bushing corresponding to the larger end portion of said auxiliary shaft, and the outer diameter of said smaller size bushing corresponding to the smaller end portion of said auxiliary shaft.

* * * * *